United States Patent [19]

Joseph

[11] Patent Number: 5,109,922
[45] Date of Patent: May 5, 1992

[54] ULTRASONIC ENERGY PRODUCING DEVICE FOR AN OIL WELL

[76] Inventor: Ady A. Joseph, 100 N. Harper Ave., Los Angeles, Calif. 90048

[21] Appl. No.: 490,876

[22] Filed: Mar. 9, 1990

[51] Int. Cl.⁵ .............................................. E21B 43/25
[52] U.S. Cl. .................................. 166/65.1; 166/177; 166/249
[58] Field of Search .................. 166/65.1, 177, 249

[56] References Cited

U.S. PATENT DOCUMENTS

| | | | |
|---|---|---|---|
| 2,757,738 | 8/1956 | Ritchey . | |
| 2,806,533 | 9/1957 | Fleck | 166/249 |
| 3,322,196 | 5/1967 | Bodine, Jr. | 166/249 |
| 3,497,005 | 2/1970 | Pelopsky et al. | 166/249 X |
| 3,503,446 | 3/1970 | Brandon | 166/249 |
| 4,074,758 | 2/1975 | Scott . | |
| 4,084,638 | 4/1978 | Whiting | 166/248 |
| 4,164,978 | 8/1979 | Scott | 166/249 |
| 4,169,503 | 10/1979 | Scott | 166/65 R |
| 4,257,482 | 3/1981 | Kompanek | 166/249 |
| 4,417,621 | 11/1983 | Medlin et al. | 166/249 |
| 4,469,175 | 9/1984 | Massa | 166/249 |
| 4,512,402 | 4/1985 | Kompanek et al. | 166/249 |
| 4,658,897 | 4/1987 | Kompanek et al. | 166/249 |

*Primary Examiner*—Hoang C. Dang
*Attorney, Agent, or Firm*—Ladas & Parry

[57] ABSTRACT

An ultrasonic energy producing device for reducing the viscosity of oil in an oil well. The device includes: an electroacoustic transducer for converting an alternating electrical power signal at a selected voltage into acoustic energy, the transducer being arranged to be disposed in acoustic communication with oil present in the well; a source of alternating electrical power at a voltage substantially higher than the selected voltage, the source being arranged to be disposed at ground level adjacent the well; and an electrical conductor of a length sufficient to extend from ground level to at least the level of oil in the well for conducting alternating electrical power from the source to the transducer.

7 Claims, 1 Drawing Sheet

ULTRASONIC ENERGY PRODUCING DEVICE FOR AN OIL WELL

BACKGROUND OF THE INVENTION

The present invention relates to the extraction of oil from wells, and particularly to the use of ultrasonic energy to assist secondary recovery of oil from wells.

During the extraction of oil from a well, a time is reached at which the production from the well decreases to an uneconomically low value. This occurs because the quantity of oil remaining in the well is reduced, the remaining oil has a relatively high viscosity, and the pressure in the well has decreased to a low value.

In order to increase production of the remaining oil, or to perform "secondary recovery", various techniques have been proposed. One of these techniques involves exposure of the remaining oil to ultrasonic energy, which has been found to create a temporary reduction in the viscosity of the oil. In order to employ this technique on a practical level, it has been proposed to dispose an electroacoustic transducer element in the region of an oil producing formation of an oil well and to supply the transducer with alternating current at a suitable frequency. One such arrangement is disclosed in U.S. Pat. No. 3,322,196, which describes arrangements in which an oscillator and amplifier and associated electrical components for producing the electrical signal are disposed within the well in close proximity to the transducer element.

The reason for disposing the electrical components in proximity to the transducer element is to prevent unacceptably high electrical losses between the power generating components and the transducer itself.

In general, it is considered necessary to connect a power supply to an electroacoustic transducer element by a cable having a relatively short length. For example, a known device for reducing the viscosity of liquids in laboratory and industrial applications is specified to be usable with a cable having a length not exceeding 19 feet.

However, the use of such an arrangement in an oil well has been found to present a number of drawbacks. Thus, for example, all of the electrical components are relatively bulky so that difficulties are encountered in mounting these components for introduction into the well. Moreover, because of the high temperatures which exist within a well having any significant depth, various components of the electrical system will fail after a short period of time.

SUMMARY OF THE INVENTION

It is an object of the present invention to provide an ultrasonic energy producing device for use in oil wells which avoids the above-noted drawbacks.

Another object of the invention is to effectively drive an electroacoustic transducer element located within an oil producing formation in a deep well by alternating electrical power generated at ground level.

Another object of the invention is to eliminate the requirement for disposing of electrical components which are sensitive to high temperatures in proximity to the transducing element.

The above and other objects are achieved, according to the present invention, by an ultrasonic energy producing device for reducing the viscosity of oil in an oil well, comprising:

an electroacoustic transducer for converting an alternating electrical power signal at a selected voltage into acoustic energy, the transducer being arranged to be disposed in acoustic communication with oil present in the well;

a source of alternating electrical power at a voltage substantially higher than the selected voltage, the source being arranged to be disposed at ground level adjacent the well; and electrical conductor means of a length sufficient to extend from ground level to at least the level of oil in the well for conducting alternating electrical power from the source to the transducer.

Since, according to the present invention, the voltage level of the alternating electrical power produced by the source is substantially higher than that which is to be supplied to the transducer, the losses occurring in even a very long cable will not prevent the delivery of an effective level of power to the transducer. Thus, all electrical components can be disposed at ground level, where they will not be subjected to the high temperatures existing in oil formation regions. Moreover, the difficulties encountered in attempting to lower such electrical components into the well are obviated.

DESCRIPTION OF THE PREFERRED EMBODIMENTS

Figure 1:
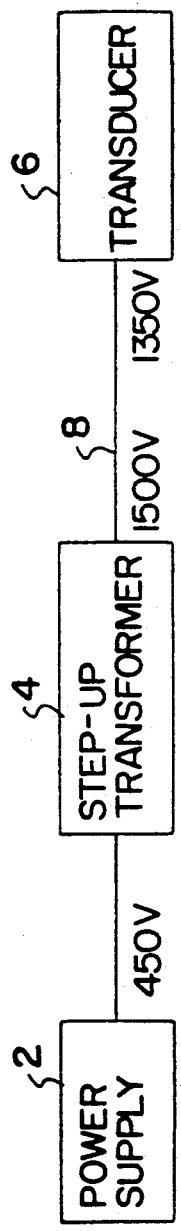
FIGS. 1 and 2 are block diagrams illustrating two preferred embodiments of devices according to the present invention.

FIG. 1 illustrates a first preferred embodiment of the invention composed of a power supply 2 connected by suitable conductors to a step-up transformer 4. Both of these components are located at the ground surface adjacent a well. Suspended within the well is an electroacoustic transducer, also known as a horn, 6 which is connected to transformer 4 via a long cable 8 which can have a length of several thousand feet. In the illustrated embodiment, power supply 2 is constructed to produce an output square wave having a peak voltage level of 450 volts. The peak voltage of this square wave power is increased to a level of 1500 volts by transformer 4. It has been found that when the power from transformer 4 is conducted to transducer 6 via a cable 8 having a length of the order of 4000 feet, the voltage drop along the length of cable 8 is of the order of 150 volts. Accordingly, the peak voltage level of the square wave reaching transducer 6 has a magnitude of the order of 1350 volts, which will cause transducer 6 to produce a high level of ultrasonic energy.

Figure 2:
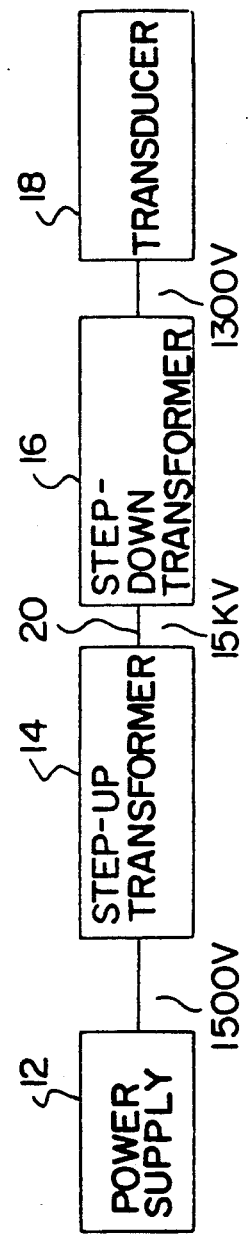

The embodiment shown in FIG. 2 is intended for use in even deeper wells. According to this embodiment, power supply 12 produces a square wave output signal at a peak voltage level of 1500 volts and this power is converted, in step-up transformer 14, to a square wave pulse train having a peak voltage of 15 kV. Here again, power supply 12 and transformer 14 are located at ground level, adjacent the well.

Within the well, in the vicinity of an oil producing formation where production is to be stimulated, there are disposed a step-down transformer 16 and a transducer 18 which can be identical to transducer 6 of FIG. 1. Transformer 14 is connected to transformer 16 via a long cable 20. Because, for a result in lower power losses, cable 20 can have a relatively great length, as much as of the order of 10,000 feet, without creating significant losses. At the input of transformer 16, the peak voltage of the pulses can be of the order of 13 kV, and this peak voltage is stepped down to a value of the order of 1300 V by transformer 16.

Thus, by significantly raising the voltage at the input end of the long cable 8, 20, it becomes possible to supply high frequency driving energy at a desirable high voltage to a transducer located at the bottom of a well while maintaining all active components which are likely to be deteriorated at high temperatures at ground level.

Preferably, the frequency of the square wave power is of the order of 20 kHz. Transducer 6, 18 may be a commercially available device of the type manufactured by the Branson Company under the designation of model no. 105, the device utilized in an experimental system according to the present invention bearing part no. DJ01034A.

The transformer 4 may be, for example, an induction type transformer manufactured by Phillips having a 5:1 ratio.

The power supply 2, 12 can be a modified version of equipment marketed by the Branson Company. Currently, that company markets a product which they identify as a 2000 W ultrasonic power supply, model 188 P. For use in the embodiment of FIG. 2, the commercially available product would be modified in the following manner: the input DC bus voltage supplied thereto would be increased to 450 VDC, the power transistors, which are mounted on a transistor heat sync assembly, would be replaced by transistors of the type BUX98A; and the resulting square wave power produced by the power supply would then have peak voltage value of 1500 VDC. By varying the input voltage to such a modified power supply, it can be made to produce the desired square wave output at a peak voltage of 450 V. It will, of course, be appreciated that other combinations of power supply peak output voltage and transformer transformation ratios can be selected within the spirit of the invention.

Thus, devices according to the present invention include power supply units which can be located at ground level and produce a square wave output having a peak voltage substantially higher than that proposed in the prior art so that even if the electroacoustic transducer is connected to the source of operating power via a very long cable, measuring several thousands of feet, the voltage and power levels delivered to the transducer are sufficient to allow for the generation of high energy ultrasonic vibrations which will produce the desired viscosity reducing effect.

It has been found that the commercially available electroacoustic transducer identified above operates quite well when supplied with power in the form of square wave pulses having a peak magnitude of the order of 1300-1350 V.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An ultrasonic energy producing device for reducing the viscosity of oil in an oil well, comprising:
   an electroacoustic ultrasonic energy transducer for converting an alternating electrical power signal at a selected voltage into ultrasound energy, said transducer being arranged to be disposed in acoustic communication with oil present in the well;
   a power supply for producing alternating electrical power at a voltage substantially higher than the selected voltage, said power supply being arranged to be disposed at ground level adjacent the well;
   electrical conductor means of a length sufficient to extend from ground level to at least the level of oil in the well for conducting alternating electrical power from said power supply to said transducer;
   a step-up transformer connected between said power supply and an input end of said conductor means for stepping up the voltage of the power produced by said supply; and
   a step-down transformer arranged to be disposed in physical proximity to said transducer and to be connected in series between an output end of said conductor means and said transducer.

2. A device as defined in claim 1, wherein said power supply produces electrical power in the form of a square wave having a frequency in the ultrasonic range.

3. A device as defined in claim 2 wherein the frequency of the square wave is in the range of 20 kHz.

4. A device as defined in claim 1, wherein the power produced by said power supply has a peak voltage of the order of 450 V and said step-up transformer has a transformer ratio of the order of 3:1 to 6:1.

5. A device as defined in claim 4 wherein said conductor means comprises a cable having a length of at least 4000 feet.

6. A device as defined in claim 1 wherein the power produced by said power supply has a peak voltage of the order of 1500 V, said step-up transformer has a transformation ratio of the order of 10:1, and said step-down transformer has a transformation ratio of the order of 1:10.

7. A device as defined in claim 6 wherein said conductor means comprises a cable having a length of at least 10,000 feet.

* * * * *